(12) United States Patent
Aznag

(10) Patent No.: US 8,375,503 B2
(45) Date of Patent: Feb. 19, 2013

(54) WIPER BLADE

(75) Inventor: Mohamed Aznag, Scherpenheuvel-Zichem (BE)

(73) Assignee: Robert Bosch GmbH, Stuttgart (DE)

(*) Notice: Subject to any disclaimer, the term of this patent is extended or adjusted under 35 U.S.C. 154(b) by 269 days.

(21) Appl. No.: 12/669,822

(22) PCT Filed: Jul. 14, 2008

(86) PCT No.: PCT/EP2008/059176
§ 371 (c)(1),
(2), (4) Date: Jan. 20, 2010

(87) PCT Pub. No.: WO2009/033854
PCT Pub. Date: Mar. 19, 2009

(65) Prior Publication Data
US 2010/0180395 A1   Jul. 22, 2010

(30) Foreign Application Priority Data

Sep. 12, 2007  (DE) .......................... 10 2007 043 528

(51) Int. Cl.
*A46B 7/06* (2006.01)
(52) U.S. Cl. ................. 15/250.201; 15/250.44
(58) Field of Classification Search ............ 15/250.201, 15/250.43, 250.44, 250.451, 250.452, 250.453, 15/250.454, 250.361
See application file for complete search history.

(56) References Cited

U.S. PATENT DOCUMENTS 3,041,654 A * 7/1962 Anderson ................ 15/250.451
6,253,412 B1 * 7/2001 Herrmann et al. ....... 15/250.454
6,523,218 B1 * 2/2003 Kotlarski ................. 15/250.201
6,675,432 B1 * 1/2004 De Block .................. 15/250.32
7,318,246 B2 * 1/2008 Kim .......................... 15/250.43
(Continued)

FOREIGN PATENT DOCUMENTS

| DE | 10139104 | 3/2003 |
|---|---|---|
| DE | 10245693 | 4/2004 |
| RU | 2012507 | 5/1994 |
| WO | 2005/115813 A1 | 12/2005 |
| WO | 2007/031260 A1 | 3/2007 |

OTHER PUBLICATIONS

PCT/EP2008/059176 International Search Report.

*Primary Examiner* — Branon Painter
(74) *Attorney, Agent, or Firm* — Michael Best & Friedrich LLP

(57) ABSTRACT

The invention is based on a wiper blade (10) having a wiping strip (12) and two spring rails (22) which serve as a supporting element and are inserted into lateral longitudinal grooves (20) in the wiping blade (12) and are permanently connected to one another at their ends by a bridge (24), wherein a wiper blade termination (25) is provided at the end of the wiper blade (10), the base element (26) of which wiper blade termination (25) is guided on the spring rails (22), is secured relative to the spring rails (22) and has a pointed-tip holder (40), the tip of which (66) engages in the wiping strip (12) in the mounted state and secures the wiping strip (12) relative to the spring rails (22). It is proposed that the base element (26) have, in its cover wall (34), a detent opening (28) which locks with the bridge (24) during installation and also a lateral opening (30) into which the pointed-tip holder (40) can be inserted and locked in the end position on the base element (26), wherein the tip (66) penetrates the wiping strip (12) laterally.

21 Claims, 4 Drawing Sheets

U.S. PATENT DOCUMENTS

| | | | |
|---|---|---|---|
| 7,581,280 B2* | 9/2009 | Op't Roodt et al. | 15/250.43 |
| 2006/0112511 A1* | 6/2006 | Op't Roodt et al. | 15/250.43 |
| 2007/0289082 A1* | 12/2007 | Herinckx et al. | 15/250.361 |
| 2008/0016643 A1* | 1/2008 | Braun et al. | 15/250.361 |
| 2008/0276404 A1* | 11/2008 | Bauer et al. | 15/250.361 |
| 2009/0013492 A1* | 1/2009 | Henin | 15/250.452 |
| 2011/0126373 A1* | 6/2011 | Ishida et al. | 15/250.361 |

* cited by examiner

WIPER BLADE

BACKGROUND OF THE INVENTION

The invention is based on a wiper blade.

DE 10 2004 051 467 A1 discloses a wiper blade of the type in question. A multipart end cap, the base element of which is guided on the spring rails by means of guide profiles, is provided at the end of the wiper blade. A cover is connected in an articulated manner to the base element and, in the fitted state, assumes a closure position. With the cover open, the component can be removed from the end of the wiper strip. A worn wiper strip can then be replaced by a new one. After the replacement, the base part with the cover open is joined onto the end of the wiper strip until detent hooks lock with their detent lugs on that side of the bridge which faces away from the end of the wiper blade. The base part is thereby secured in the longitudinal direction at the end of the spring rails. If the cover, the pivot axis of which runs transversely with respect to the longitudinal direction of the wiper blade, is closed, an eccentric mechanism, which is integrally formed on the cover, presses onto a spring tongue. The latter is arranged pivotably on the base element and, on the side facing the wiper strip, has a locking spike, the tip of which penetrates the head strip during the closure of the cover. The wiping strip is therefore secured relative to the spring rails via the end cap.

The base part and the cover preferably consist of plastic. They are produced as individual components in an injection molding process. In one configuration, the spike tip is integrally formed on that side of the cover which faces the wiping strip, and, when the cover is closed, penetrates the head strip of the wiping strip from above. In the closed position, the cover is locked in relation to the base element.

SUMMARY OF THE INVENTION

According to the invention, the base element has, in its cover wall, a detent opening which locks with the bridge during installation. In this case, the bridge can end substantially flush with the outer contour of the cover wall, thus resulting overall in a flat concept for the wiper blade termination. The base element also has a lateral opening into which the pointed-tip holder can be inserted and locks in the end position on the base element, wherein the tip penetrates the wiping strip laterally. By means of the lateral arrangement of the pointed-tip holder and of the tip, the flat overall height of the wiper blade termination is maintained. According to a refinement of the invention, the pointed-tip holder has a guide block with lateral guide grooves which match guide webs on the edge of the lateral opening. The lateral opening, like the guide block, is inevitably arranged offset with respect to the bridge in the longitudinal direction of the wiper blade, and therefore the overall height of the base element is not affected by said structural elements. The end position of the pointed-tip holder is expediently brought about by means of a detent which is integrally formed on the guide block in the installation direction and, in the fitted state, locks with a detent edge in a detent notch on the inner side of the cover wall. The arrangement of the detent elements, namely of the detent edge and detent notch, may be interchanged.

According to a further refinement of the invention, a push-in compartment for a pointed-tip plate, the tip of which faces the wiper strip, is located on the inner side of the guide block between two guide grooves. In this case, the pointed-tip plate is advantageously locked on the pointed-tip holder by means of detent elements. The latter may comprise a detent hole in the base of the pointed-tip plate and a detent pin on the pointed-tip holder. In principle, however, it is also possible for a detent pin to be integrally formed on the pointed-tip plate, said detent pin locking with a depression in the guide block of the pointed-tip holder. The tip of the pointed-tip plate protrudes for a distance out of the guide grooves towards the wiping strip, but is shielded at a small distance by the detent for securing the guide block on the base element, as a result of which the risk of injury before the installation of the pointed-tip holder is greatly reduced. Since the tip on a pointed-tip plate is made from steel, it can be of stable and nevertheless very flat design such that it easily penetrates the wiping strip during installation without buckling.

In order to release the detent which secures the pointed-tip holder on the base element, a press button is arranged on the guide block. Said press button can protrude for a distance out of the lateral opening, in particular if the base element and the pointed-tip holder are covered by a covering cap. The covering cap is guided with guide profiles on the base element and has a closed end wall at the end. As a result, the wiper blade termination obtains a compact outer contour with advantageous properties in terms of flow and good design qualities. The covering cap may be matched substantially, depending on the individual case, to different circumstances. The approach flow side thereof expediently has a wind deflecting profile and the open end side thereof has a connection profile for connection to a spoiler. In this case, the press button for releasing the pointed-tip holder can be arranged in the region of the maximum elevation of the wind deflecting profile and can be matched to the inner contour of the covering cap such that the outer contour of the covering cap is not disturbed as a result.

In order to secure the covering cap on the base element, detent elements in the form of cutouts and projections which lock to one another during installation are provided on the lower limbs of the guide profiles of the covering cap.

If the wiper strip is worn, it generally suffices solely to renew the wiping strip. However, it may also emerge that the wiper blade termination has become shabby or defective over the course of time. In this case, it is expedient to provide the wiper strip termination with a separate replacement part.

BRIEF DESCRIPTION OF THE DRAWINGS

Further advantages emerge from the description below of the drawing. An exemplary embodiment of the invention is illustrated in the drawing. The drawing, the description and the claims contain numerous features in combination. A person skilled in the art will expediently also consider the features individually and put them together to form meaningful further combinations.

In the drawing.

DETAILED DESCRIPTION

Figure 1:
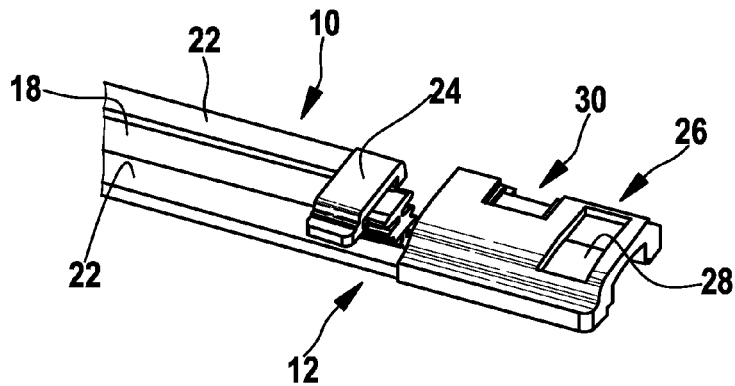
FIG. 1 shows a perspective illustration of one end of a wiper blade with a base element which is to be mounted.
Figure 2:
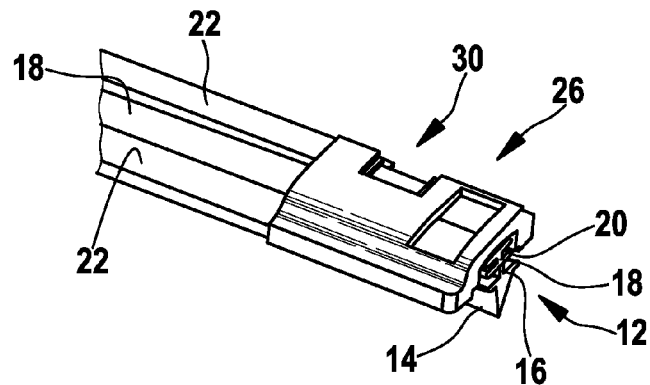
FIG. 2 shows a wiper blade end according to FIG. 1 with the base element mounted.
Figure 3:
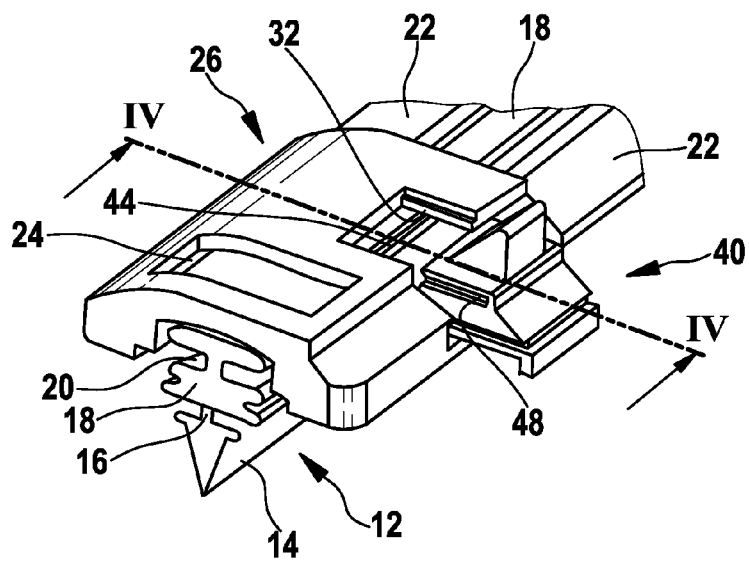
FIG. 3 shows a wiper blade end according to FIG. 2 with a semi-mounted pointed-tip holder.
Figure 4:
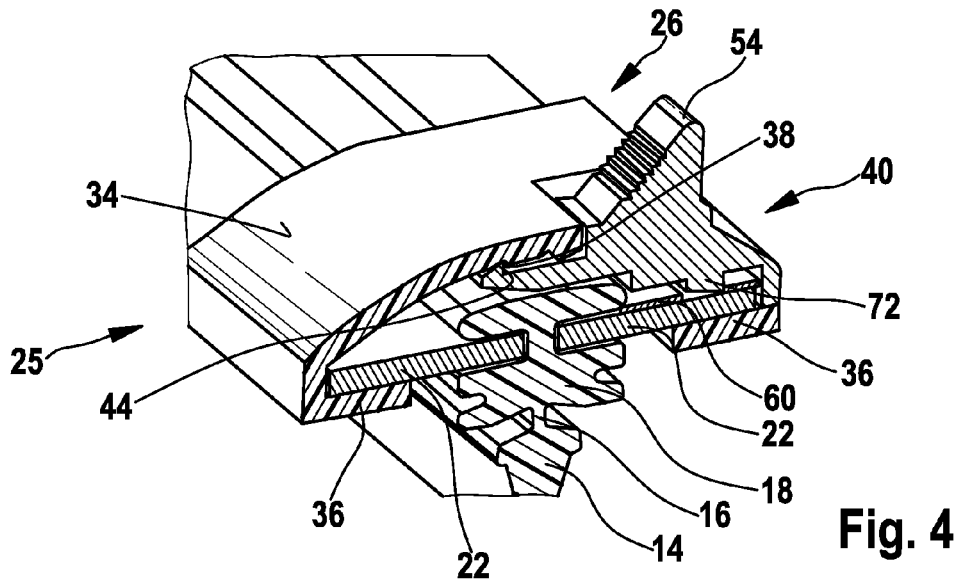
FIG. 4 shows a section corresponding to the line IV-IV in FIG. 3.
Figure 5:
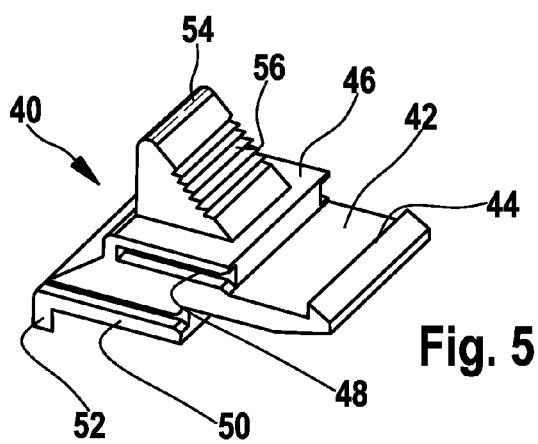
FIG. 5 shows a perspective illustration of a pointed-tip holder.
Figure 6:
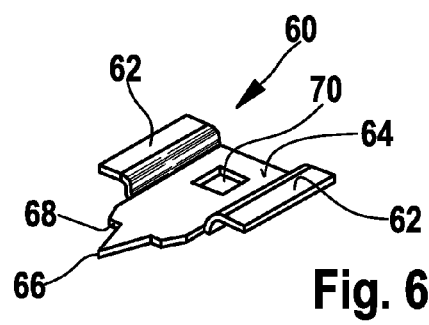
FIG. 6 shows a perspective illustration of a pointed-tip plate.
Figure 7:
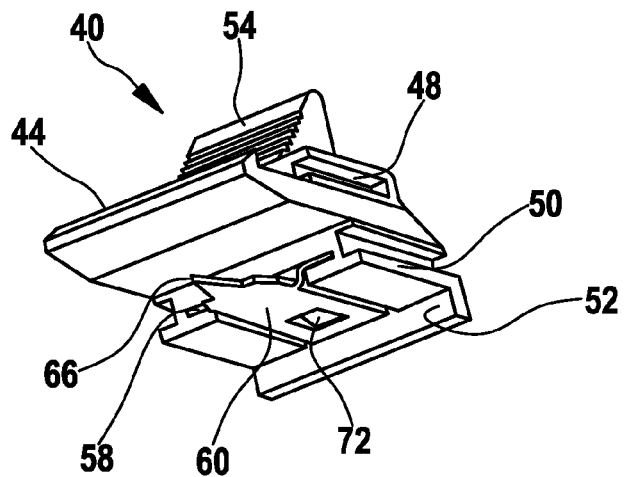
FIG. 7 shows a pointed-tip holder with a mounted pointed-tip plate.
Figure 8:
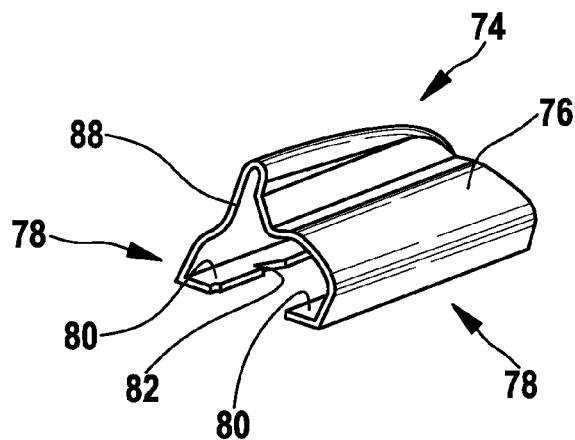
FIG. 8 shows a perspective illustration of a covering cap.
Figure 9:
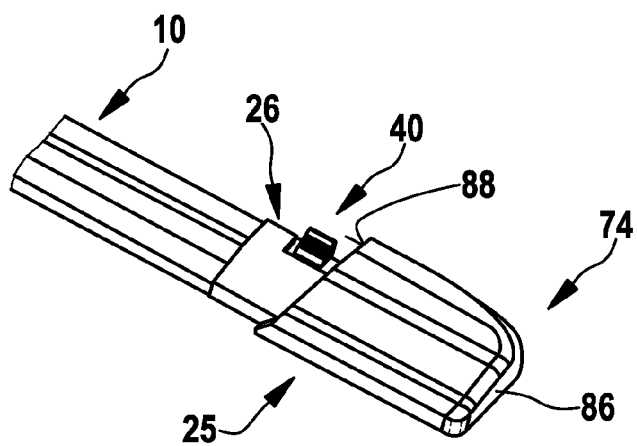
FIG. 9 shows a wiper blade end with a semi-mounted covering cap.
Figure 10:
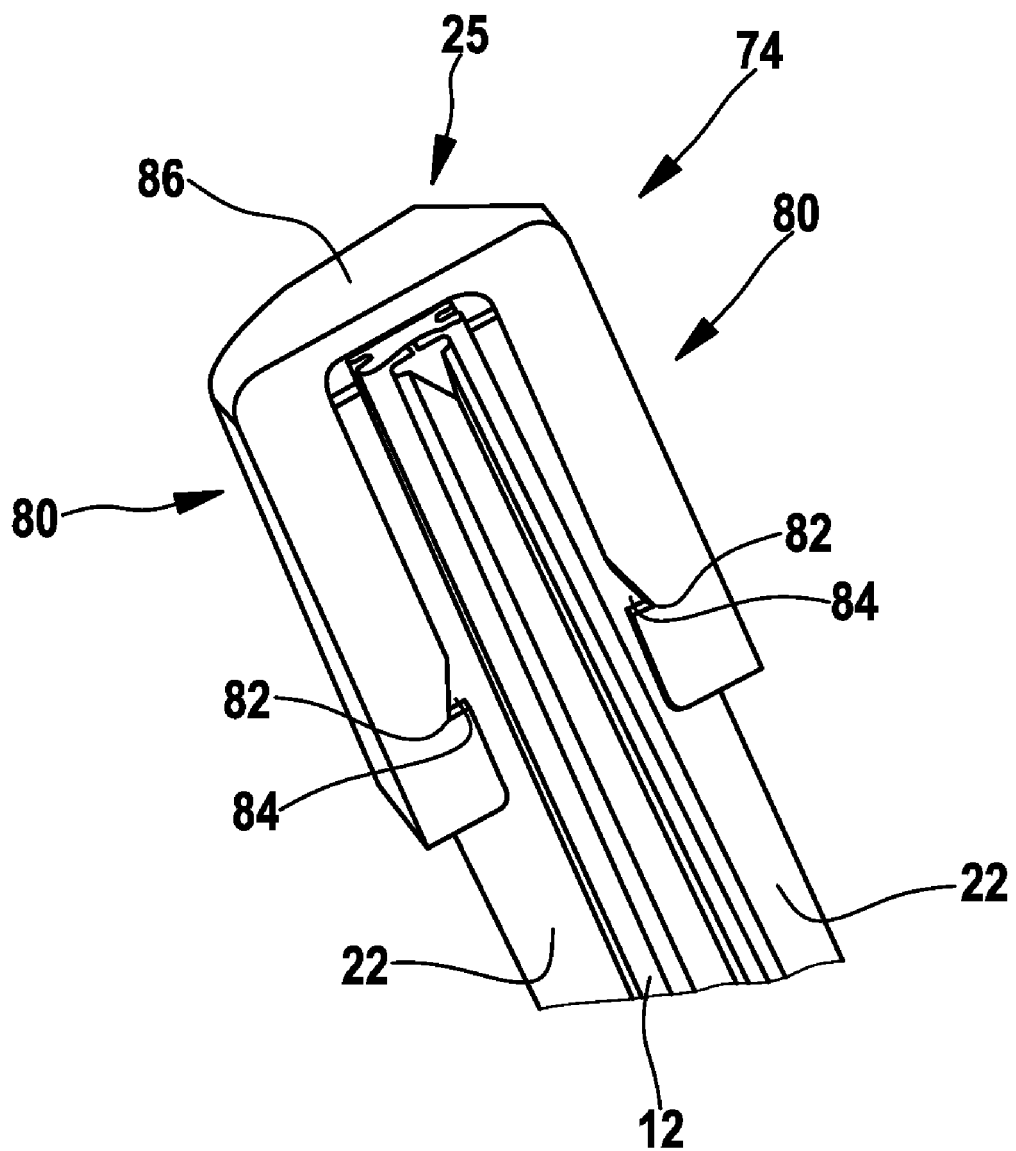
FIG. 10 shows a wiper blade end according to FIG. 9 from below with a mounted covering cap.

FIG. 1 shows the end of a wiper blade 10 which has a wiping strip 12 and two spring rails 22 as a supporting element. Said spring rails are inserted in two lateral longitudinal grooves 20 in a head strip 18 of the wiping strip 12 and are permanently connected to one another at their ends via a bridge 24. The wiping strip 12 has a wiping lip 14 which is connected to the head strip 18 via a tilting web 16. A wiper blade termination 25 which comprises a base element 26 and a pointed-tip holder 40 is provided at the end of the wiper blade 10. The base element 26, which has a flat cross-sectional profile, is pushed from the end of the wiper blade 10 onto the spring rails 22 and is guided between longitudinal flanges 36 and a cover wall 34. The cover wall 34 contains a detent opening 28 which is matched to the contour of the bridge 24 and which locks with the bridge 24 during installation. In the fitted state, the bridge 24 can end substantially flush with the outer contour of the cover wall 34, thus resulting in a harmonious design.

In addition, the base element 26 has a lateral opening 30 into which the pointed-tip holder 40 is inserted. Use is made for this purpose, on the edges of the opening 30, of guide rails 32 which engage in lateral guide grooves 48 on a guide block 46 of the pointed-tip holder 40. The pointed-tip holder 40 is secured in its end position by a detent 42 which is integrally formed on the guide block 46 and engages with a detent edge 44 in a detent notch 38 on the inner side of the cover wall 34. In principle, it is also possible for the detent notch 38 to be arranged on the pointed-tip holder 40 and for the detent edge 44 to be arranged on the base element 26.

A push-in compartment for a pointed-tip plate 60 is located on that side of the pointed-tip holder 40 which faces the wiping lip 14. Said push-in compartment is substantially formed by two guide grooves 58 which lie opposite one another at a distance. The latter receive guide cheeks 62 integrally formed laterally on the pointed-tip plate 60. The pointed-tip plate 60 is inserted into the guide grooves 58 in such a manner that its tip 66 faces the wiping strip 12. The tip 66 is delimited with respect to the base 64 of the pointed-tip plate 60 by means of stop surfaces 68. The pointed-tip plate 60 is expediently produced from a steel plate in a sheet-metal bending and punching process in which a detent hole 70 is punched into the base 64, said detent hole interacting with a detent pin 72 which is arranged between the guide grooves 58 on that side of the guide block 46 which faces the pointed-tip plate 60. The steel plate permits a flat and nevertheless stable design of the pointed-tip plate 60, and the tip 66 can be shaped as a lancet. When the pointed-tip plate 60 is mounted in the pointed-tip holder 40, its tip 66 protrudes for a distance over the guide grooves 58 such that, during installation, the tip 66 penetrates a longitudinal web between the longitudinal grooves 20 of the head strip 18 above the guide rails 22. As a result, the wiping strip 12 is secured relative to the spring rails 22 via the wiping strip termination 25. The assigned spring rail 22 is covered on its longitudinal side in the region of the pointed-tip holder 40 by a terminating wall 52 which is integrally formed on the pointed-tip holder 40. To better guide the pointed-tip holder 40, guide webs 50 which engage in corresponding grooves in the base element 26 are located in the region of the terminating wall 52.

In order to unlock the pointed-tip holder 40, the latter has a press button 54 with a gripping surface 56. With said press button 54, the detent edge 44 can be pressed out of the detent notch 38 such that the pointed-tip holder 40 can be pushed out of the base element 26 counter to the installation direction. At the same time, the tip 66 of the pointed-tip plate 60 is removed from the wiper strip 12, and therefore the latter can be pulled out of the intermediate space between the spring rails 22. If the wiper blade 10 has a spoiler (not illustrated), the wiper strip termination 25 expediently comprises a covering cap 74 which is guided with guide profiles 78 on the base element 26 and is secured by detent elements in the form of detent notches 82 in the lower limbs 80 of the guide profiles 78 and detent cams 84 on the base element 26. The approach flow side of the covering cap 74 has a wind deflecting profile 76 which is matched to the wind deflecting profile of the spoiler. Furthermore, a connection profile 88 is provided on the open end side, which is directed in an opposite manner to an outwardly directed, closed end wall 86 of the covering cap 74, said connection profile ensuring a harmonious transition which is advantageous in terms of flow between the end of the spoiler and the covering cap 74. The press button 54 is expediently arranged in the region of the maximum elevation of the wind deflecting profile 76. The press button is matched to the inner contour of the covering cap 74 in such a manner that the outer contour, in particular the wind deflecting profile 76, is not impaired by the press button 54.

The invention claimed is:

1. A wiper blade (10) having a longitudinal direction and comprising a wiping strip (12) and two spring rails (22) which extend in the longitudinal direction and serve as a supporting element, wherein the spring rails are coplanar and define a plane, have ends, are inserted into lateral longitudinal grooves (20) in the wiping strip (12) and are permanently connected to one another at their ends by a bridge (24), wherein a wiper blade termination (25) is provided at an end of the wiper blade (10), a base element (26) of which wiper blade termination is guided on the spring rails (22), and is secured relative to the spring rails (22) and has a pointed-tip holder (40), a tip (66) of which engages in the wiping strip (12) in a mounted state and secures the wiping strip (12) relative to the spring rails (22), characterized in that the base element (26) includes a cover wall (34) having therein a detent opening (28) which locks with the bridge (24) during installation, and the base element also has a lateral opening (30) into which the pointed-tip holder (40) is removably inserted, the pointed-tip holder being inserted into the lateral opening in a direction perpendicular to the longitudinal direction and parallel to the plane defined by the spring rails, and being inserted such that the pointed-tip holder locks in an end position on the base element (26), wherein the tip (66) penetrates the wiping strip (12) laterally.

2. The wiper blade (10) as claimed in claim 1, characterized in that the pointed-tip holder (40) has a guide block (46) with lateral guide grooves (48) which match guide webs (50) on the edge of the lateral opening (30).

3. The wiper blade (10) as claimed in claim 2, characterized in that a detent (42) is integrally formed on the guide block (46) in an installation direction, said detent locking in a fitted state with a detent edge (44) in a detent notch (38) on an inner side of the cover wall (34).

4. The wiper blade (10) as claimed in claim 2, characterized in that a push-in compartment for a pointed-tip plate (60), a tip (66) of which faces the wiping strip (12), is located on an inner side of the guide block (46) between two guide grooves (58).

5. The wiper blade (10) as claimed in claim 4, characterized in that a base (64) of the pointed-tip plate (60) has a detent element (70) which locks with a corresponding detent element (84) on the pointed-tip holder (40).

6. The wiper blade (10) as claimed in claim 2, characterized in that a press button (54) for releasing the detent (42) is arranged on the guide block (46).

7. The wiper blade (10) as claimed in claim 6, characterized in that a covering cap (74) covers the base element (26) and the pointed-tip holder (40), said covering cap being guided with guide profiles (78) on the base element (26) and having a closed end wall (86) at the end.

8. The wiper blade (10) as claimed in claim 7, characterized in that an approach flow side of the covering cap (74) has a wind deflecting profile (76) and an open end side of said covering cap has a connection profile (88) for connection to a spoiler.

9. The wiper blade (10) as claimed in claim 7, characterized in that the press button (54) is arranged in a region of the maximum elevation of the wind deflecting profile (76) and is matched to an inner contour of the covering cap (74).

10. The wiper blade (10) as claimed in claim 7, characterized in that detent elements (82) which interact with detent elements (84) on the base element (26) are provided on lower limbs (80) of the guide profiles (78).

11. The wiper blade (10) as claimed in claim 1, characterized in that the lateral opening is offset from the detent opening in the longitudinal direction.

12. A wiper blade (10) having a wiping strip (12) and two spring rails (22) which serve as a supporting element, wherein the spring rails have ends, are inserted into lateral longitudinal grooves (20) in the wiping strip (12) and are permanently connected to one another at their ends by a bridge (24), wherein a wiper blade termination (25) is provided at an end of the wiper blade (10), a base element (26) of which wiper blade termination is guided on the spring rails (22), and is secured relative to the spring rails (22) and has a pointed-tip holder (40), a tip (66) of which engages in the wiping strip (12) in a mounted state and secures the wiping strip (12) relative to the spring rails (22), characterized in that the base element (26) includes a cover wall (34) having therein a detent opening (28) which locks with the bridge (24) during installation, and the base element also has a lateral opening (30) into which the pointed-tip holder (40) can be inserted and locks in an end position on the base element (26), wherein the tip (66) penetrates the wiping strip (12) laterally, and characterized in that the pointed-tip holder (40) has a guide block (46) with lateral guide grooves (48) which match guide webs (50) on the edge of the lateral opening (30).

13. The wiper blade (10) as claimed in claim 12, characterized in that a detent (42) is integrally formed on the guide block (46) in an installation direction, said detent locking in a fitted state with a detent edge (44) in a detent notch (38) on an inner side of the cover wall (34).

14. The wiper blade (10) as claimed in claim 12, characterized in that a push-in compartment for a pointed-tip plate (60), a tip (66) of which faces the wiping strip (12), is located on an inner side of the guide block (46) between two guide grooves (58).

15. The wiper blade (10) as claimed in claim 14, characterized in that a base (64) of the pointed-tip plate (60) has a detent element (70) which locks with a corresponding detent element (84) on the pointed-tip holder (40).

16. The wiper blade (10) as claimed in claim 12, characterized in that a press button (54) for releasing the detent (42) is arranged on the guide block (46).

17. The wiper blade (10) as claimed in claim 16, characterized in that a covering cap (74) covers the base element (26) and the pointed-tip holder (40), said covering cap being guided with guide profiles (78) on the base element (26) and having a closed end wall (86) at the end.

18. The wiper blade (10) as claimed in claim 17, characterized in that an approach flow side of the covering cap (74) has a wind deflecting profile (76) and an open end side of said covering cap has a connection profile (88) for connection to a spoiler.

19. The wiper blade (10) as claimed in claim 17, characterized in that the press button (54) is arranged in a region of the maximum elevation of the wind deflecting profile (76) and is matched to an inner contour of the covering cap (74).

20. The wiper blade (10) as claimed in claim 17, characterized in that detent elements (82) which interact with detent elements (84) on the base element (26) are provided on lower limbs (80) of the guide profiles (78).

21. The wiper blade (10) as claimed in claim 12, characterized in that the lateral opening is offset from the detent opening in the longitudinal direction.

* * * * *